United States Patent

[11] 3,622,823

| [72] | Inventors | Alexander Richard William Broadway<br>Westbury-on-Trym;<br>William Fong, Westbury-on-Trym; Gordon<br>Hindle Rawcliffe, Bristol, all of England |
|---|---|---|
| [21] | Appl. No. | 18,565 |
| [22] | Filed | Mar. 11, 1970 |
| [45] | Patented | Nov. 23, 1971 |
| [73] | Assignee | National Research Development Corporation |
| [32] | Priority | Mar. 24, 1969 |
| [33] | | Great Britain |
| [31] | | 15,296/69 |

[54] ROTARY ELECTRIC MACHINES
3 Claims, 15 Drawing Figs.

[52] U.S. Cl. .................................................. 310/254, 310/179
[51] Int. Cl. .................................................. H02k 1/12
[50] Field of Search.................................... 310/254, 256, 258, 259, 179, 192, 184, 200, 211, 216, 174, 192, 193, 217; 29/598, 609, 605

[56] References Cited
UNITED STATES PATENTS

| 1,723,912 | 8/1929 | Bergman | 310/254 |
| 2,649,561 | 8/1953 | Hutchins | 310/254 |
| 2,830,209 | 4/1958 | Fleckenstein | 310/254 |
| 3,054,010 | 9/1962 | Breitling | 310/216 |
| 3,154,708 | 10/1964 | Shaffer | 310/258 |
| 3,207,935 | 9/1965 | Mosovsky | 310/216 |
| 3,235,762 | 2/1966 | Brammerlo | 310/216 |
| 3,421,034 | 1/1969 | Hershberger | 310/192 |
| 3,421,209 | 1/1969 | Gibbs | 29/609 |

*Primary Examiner*—D. F. Duggan
*Assistant Examiner*—R. Skudy
*Attorney*—Larson, Taylor & Hinds

ABSTRACT: A three-phase motor with a stator winding wound on flat-sided punchings. The number of flat sides must not correspond to the pole-number. The stator slots are radial and those opposite flats on the stator punchings are shallower than those opposite the corners and in some examples are omitted. The three-phase winding used is derived from a regular double-layer, uniform-pitch, diamond coil winding by omitting blocks of coils from the top and bottom layers, the omitted coil blocks being equal in number to the flat sides, being equally spaced apart in the top and bottom layers and in coincident, overlapping or adjacent slots in the top and bottom layers.

| Slot Nos. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | |
|---|---|---|---|---|---|---|---|---|---|---|---|---|---|---|---|---|---|---|---|---|---|---|---|---|---|---|---|---|---|---|---|---|---|---|---|---|---|
| Coil-pitches | | | | | | | 2/3 | | 8/9 | 7/9 | | | | | | | | | | | | | | | | | | | | | | | | | | | |
| | +A | +A | −C | −C | +B | +B | −A | −A | +C | +C | −B | −B | +A | +A | −C | −C | +B | +B | −A | −A | +C | +C | −B | −B | +A | +A | −C | −C | +B | +B | −A | −A | +C | +C | −B | −B | UPPER LAYER |
| | −C | −C | +B | +B | −A | −A | +C | +C | −B | −B | +A | +A | −C | −C | +B | +B | −A | −A | +C | +C | −B | −B | +A | +A | −C | −C | +B | +B | −A | −A | +C | +C | −B | −B | +A | +A | LOWER LAYER 2/3 (FULL PITCH) (a) |
| | +A | −C | −C | +B | +B | −A | −A | +C | +C | −B | −B | +A | +A | −C | −C | +B | +B | −A | −A | +C | +C | −B | −B | +A | +A | −C | −C | +B | +B | −A | −A | +C | +C | −B | −B | +A | LOWER LAYER 7/9 (FULL PITCH) (b) |
| | +A | +A | −C | −C | +B | +B | −A | −A | +C | +C | −B | −B | +A | +A | −C | −C | +B | +B | −A | −A | +C | +C | −B | −B | +A | +A | −C | −C | +B | +B | −A | −A | +C | +C | −B | +A | LOWER LAYER 8/9 (FULL PITCH) (c) |

ROTARY ELECTRIC MACHINES

This invention relates to rotary electric machines, in particular to three-phase, single-speed induction motors.

Although induction motors most often use stator core punchings of circular external shape, such circular punchings are not always used. Thus, for example, there has been described a squirrel cage motor having a stator core, and stator core punchings, of cutaway shape at the bottom. The purpose was to provide an electric motor of low shaft height.

The object of the present invention is to provide an electric motor using polygonal, in particular hexagonal, stator core punchings which can be cut from sheet steel with less waste of material than results with conventional circular punchings.

The use of polygonal punchings is made possible by a correspondingly irregular distribution of stator coils around the stator axis.

Accordingly, the invention provides an electric motor having a stator winding wound on a stator core comprising punchings of polygonal external shape, and circular internal shape to accommodate a rotor core, having slots of different depths, the slots of greater depth being in the region of the apeces of the polygonal core punchings and the slots of lesser depth being in the region of the sides of the polygonal core punchings, the said stator winding comprising coils spaced apart around the motor axis in a pattern showing a greater distribution in the region of the said apeces and a lesser distribution in the region of said sides of the polygonal core punchings.

In order that the invention may be readily carried into practice, the cutaway-shaped core of the earlier patent application and motors according to the present invention using polygonal cores will now be described in detail, by way of example, with reference to the accompanying drawings of which.

Figure 1:
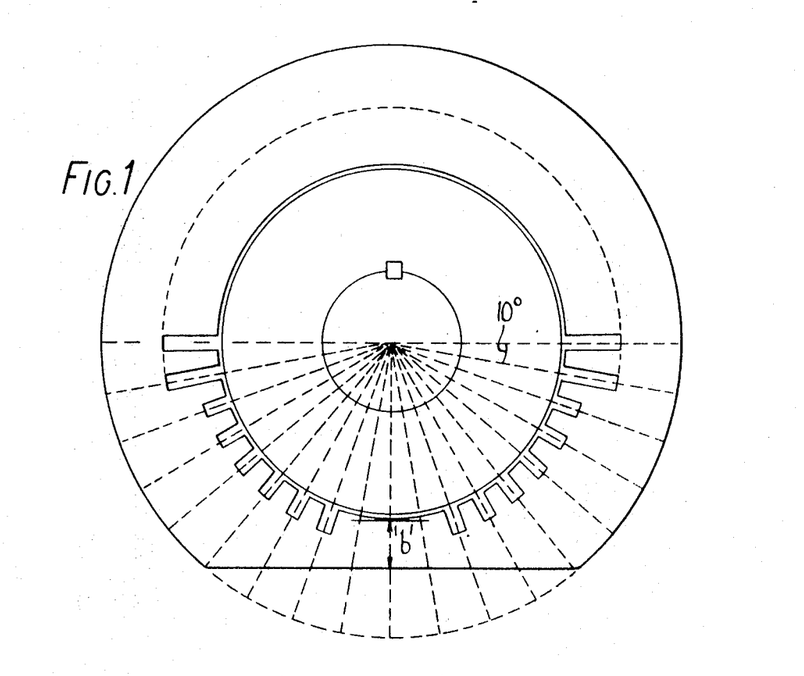
FIG. 1 shows in cross section the stator core for a motor with low shaft height.

FIG. 1 shows a stator punching of cutaway shape at the bottom to give a motor of low shaft height. The stator core has 36 slot locations at 10° spacing but has only 21 full-slots and a further 12 half-slots. The remaining three slots, at the bottom, are omitted entirely thus permitting of a cutaway portion of the core punchings, reducing the distances from the airgap to the flattened base to the dimension shown at "$b$."

The irregular shape of the magnetic circuit is offset, and magnetic saturation is thus avoided, by the omission of some coils of the motor winding and by the omission of the corresponding slots from the inside of the core, opposite the flat external surface. The core is thus geometrically asymmetrical, but magnetically balanced.

Into this core is inserted a discontinuous polyphase winding, which has a gap along the portion of the perimeter which lies opposite, or nearly opposite, the flat edge. By suitable design, such a winding can be made to give a balanced rotating field, and to draw a balanced current from the supply.

The possibility of omitting coils from a polyphase winding of normal type, and still obtaining a balanced rotating field of good m.m.f. waveform, has now been examined generally.

It has been found that if a discontinuous polyphase winding is used, it is possible to wind it in a stator punching which is externally polygonal, in particular hexagonal, without having an unbalanced or saturated magnetic circuit.

Such punchings can be cut from sheet steel without waste.

In principle, a variety of regular polygons can be used for the shape of stator punchings for motors of this type, but it is believed that the hexagonal or square shapes will prove to be the most important in practice.

Conventionally, the punchings for the stator cores of induction motors are designed to be circular. This shape is inherently wasteful of material. The area of a set of circles cut out of a very large sheet in the most economical manner is $0.907(=\pi 2\sqrt{3})$ times the area of the sheet from which the circles are cut. In principle, therefore, nearly 10 percent of the sheet steel, from which stator and rotor punchings are made, is bound to be wasted. In practice, the wastage is considerably greater, because of extra material which is lost at the edges. The total loss of material may be as much as 20 percent.

When the armature coils are to be uniformly distributed around the machine perimeter, as is conventional in most machines, circular punchings are necessary if magnetic saturation is to be avoided and good performance is thus to be obtained.

Figure 2:
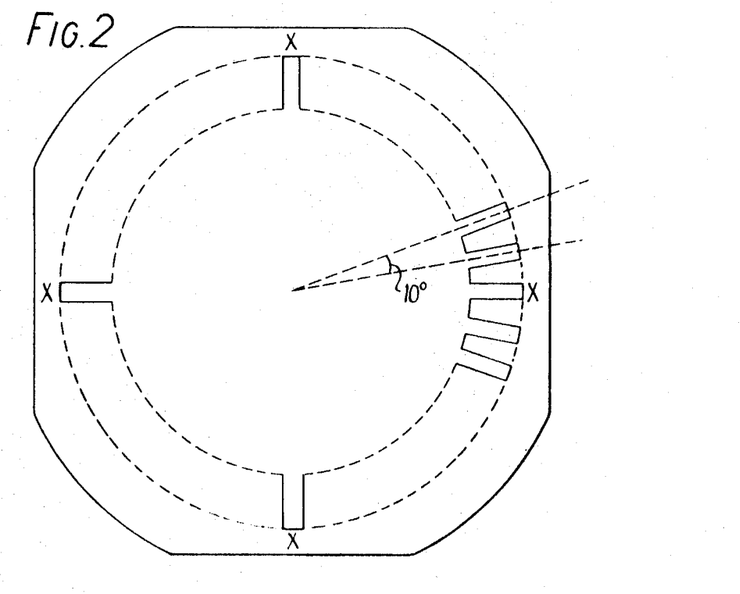
FIG. 2 shows the cross section of a stator punching with flat sides relatively to a conventional circular punching.

Sometimes, single-phase stator punchings have been made with four flat faces at 90° to one another, as shown in FIG. 2. This provides a saving in sheet steel, with the disadvantage of some saturation opposite the 'flats' and consequent increase in magnetizing current. The stator core slots are all of the same depth as shown in FIG. 2 at "X."

Machines according to the present invention are devised to permit the efficient use of triangular, rectangular, square, hexagonal, or other polygonal stator punchings. All these shapes can be punched from sheet steel with little or no waste of material.

Figure 3:
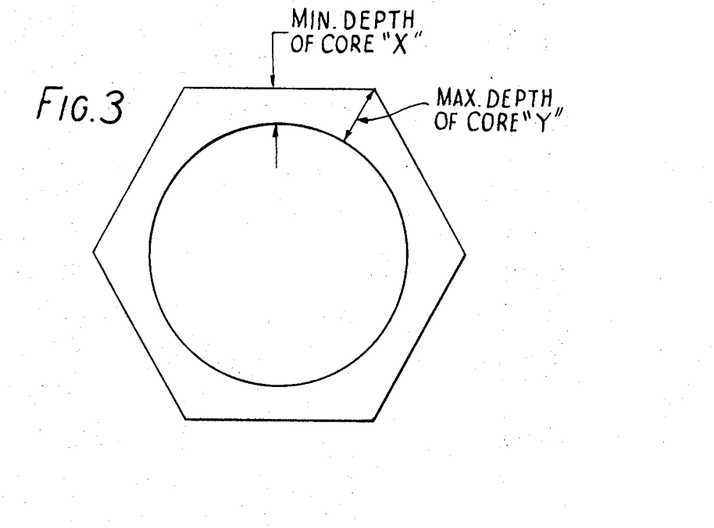
FIG. 3 shows the cross section of a hexagonal stator punching.

The rotor punchings, which are removed from the center of the stator punchings, must of course be circular. If a circular rotor punching is removed from the center of a hexagonal stator punching (for example), there will be a variation in the radial depth of the stator core. There will be six points of maximum depth and six of minimum depths, as shown in FIG. 3 at "X" and "Y" respectively. This case will now be considered in detail.

If radial slots of equal depth were punched all round the inner circumference of such a hexagonal stator punching (for example), there would be six areas adjacent the points "X" where the flux-density in the core would reach a peak, and six areas adjacent the points "Y" where it had its lowest value. But if the winding were designed so that coils could be omitted from the six densely fluxed parts of the perimeter, slots of full-depth would not require to be punched in these parts, and the core flux-density could be made much more nearly uniform. Some slots could, in some cases, be entirely omitted.

Figure 4:
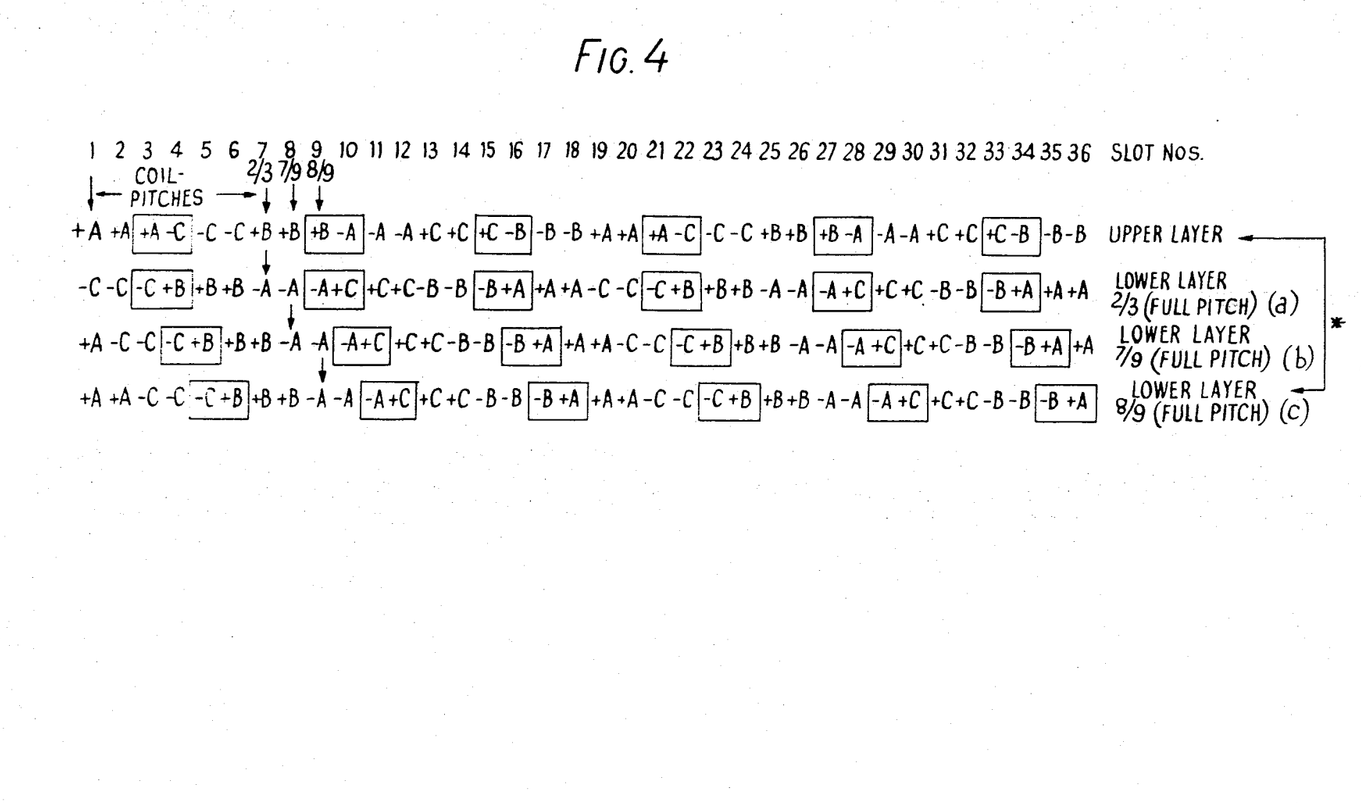
FIG. 4 shows a four-pole, three-phase winding in 36 slots for a hexagonal stator.

This process can be applied to a four-pole machine as shown by the winding of FIG. 4 by way of example. This four-pole three-phase motor with 36 stator slots is a very important case, and is thus taken as a particular example; through this number of slots is not in any way essential, and any other desired number may be used.

For a complete winding according to FIG. 4, the upper layer part shown is combined with one of the lower layer alternatives (a), (b) and (c) shown, to provide the complete winding.

If six equal, and equally spaced, groups of coils, enclosed in six rectangular 'boxes,' as shown in FIG. 4, are omitted from the initial layout of this four-pole winding, the resultant winding will still be balanced; but there will be six areas where less metal has to be removed to form slots. The reduction in slotting is determined by the proportion of winding which it is decided to remove (here one-third) and by the coil-pitch, but not by the grouping of the coils.

For example, in the alternative (a) in FIG. 4 there are two empty slots in six equidistant places around the perimeter, the coil-pitch being two-thirds (full-pitch). In the alternative (b) in FIG. 4 there are one empty slot and two half-empty slots in six equidistant places, the coil-pitch being seven-ninths (full-pitch). In the alternative (c) in FIG. 4 there are four half-empty slots in six equidistant places, the coil-pitch being eight-ninths (full-pitch). Alternative (c) of FIG. 4 provides the most convenient slotting arrangement for hexagonal punchings. All other things being equal, it is best to use the longest of these coil-pitches, that is alternative (c), since the winding factor is thereby near to its highest possible value.

Overall, therefore, a combination of polygonal punchings and coil-omission may enable the punchings to be manufactured without waste, and without producing saturation in use, but with full utilization of all materials.

The great majority of polyphase electrical windings hitherto manufactured have been of "uniform" construction in "uniform" slots of equal size. (This is true even of P.A.M. windings.) The term "uniform" here refers only to mechanical uniformity, and bears no relation to the coil groupings of the windings. A winding of the new type here proposed will be called a "discontinuous winding." Every "discontinuous" winding is best designed by starting from the corresponding "uniform" winding, and then making the necessary omissions and rearrangements.

The pattern of the required slotting in a polygonal core depends solely on the pattern of coil-omission in the discontinuous winding, and on the coil-pitch. It does not depend on the coil grouping of the corresponding uniform windings. On the other hand, the resultant m.m.f. waveform, for a particular slotting and coil-pitch, does depend on the coil grouping of the corresponding uniform winding, and on the relative disposition of the omitted coils, with respect to the uniform winding.

In the design of a normal winding, the coil-pitch is chosen by reference to the winding factor, and to the m.m.f. waveform; but the design of a "discontinuous" winding has also to consider the effect of the coil-pitch on slotting. In effect, one is less free, in such machines, to choose the coil-pitch than for a standard winding; but this will rarely be of any consequence in small machines, which are the obvious field of application for hexagonal or polygonal punchings.

The obvious coil grouping per phase for a "uniform" four-pole three-phase winding in 36 slots is 3-3-3-3, but it is also possible to group the coils 2-4-2-4 or 2-4-4-2. For each of these coil groupings there are, in principle, five other positions for the omission 'boxes,' as well as the position shown in FIG. 4. The boxes can all be advanced together by one, two, three, four or five slots from this position; until after advancing six slots, the position of FIG. 4 repeats itself. The resultant "-discontinuous" winding will be found to be the same for several positions of the 'boxes.'

The 54 possible resultant m.m.f. waveforms for these three basic "uniform" windings, using each of the six possible omission 'block' positions in each case, and for the three coil-pitches shown in FIG. 4, were readily calculated by computer. (Some of the m.m.f. patterns were duplicates of the others, and the necessary number of computations was much lower than 54). Fortunately, it was found that in every case eight-ninths (full-pitch) gave the best m.m.f. waveforms, because this also gives high winding factors and a stator slotting which is conformable with the hexagonal core, as will appear from FIG. 5.

Figure 5:
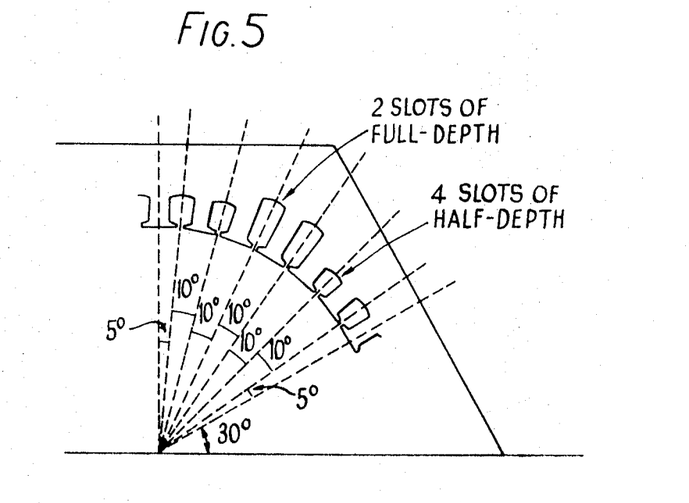
FIG. 5 shows a portion of a hexagonal stator punching showing in particular the slot arrangement throughout one 60° angle to receive the winding of FIG. 4.

FIG. 5 shows the stator punching required for a four-pole, 36-slot hexagonal motor with coils of eigth-ninths (full-pitch), each 60° section being identical with that shown.

It will be seen from FIG. 5 that the 36-slot locations are spaced apart by 10°, there being four half-depth slots adjacent the point "X" of FIG. 3 and two full-depth slots adjacent the point "Y" of FIG. 3. Thus, in all there are 12 full-depth slots and 24 half-depth slots uniformly spaced apart. There are in all 24 coils having a coil-pitch of eight slots, that is slot one to slot nine and so on.

Simple inspection will make it clear that a nearly uniform depth of core is obtained by this arrangement. As well as the size, the disposition of the slots in each 60° sector also depends on the coil-pitch of the winding to be used, as will be seen from FIG. 6.

Figure 6:
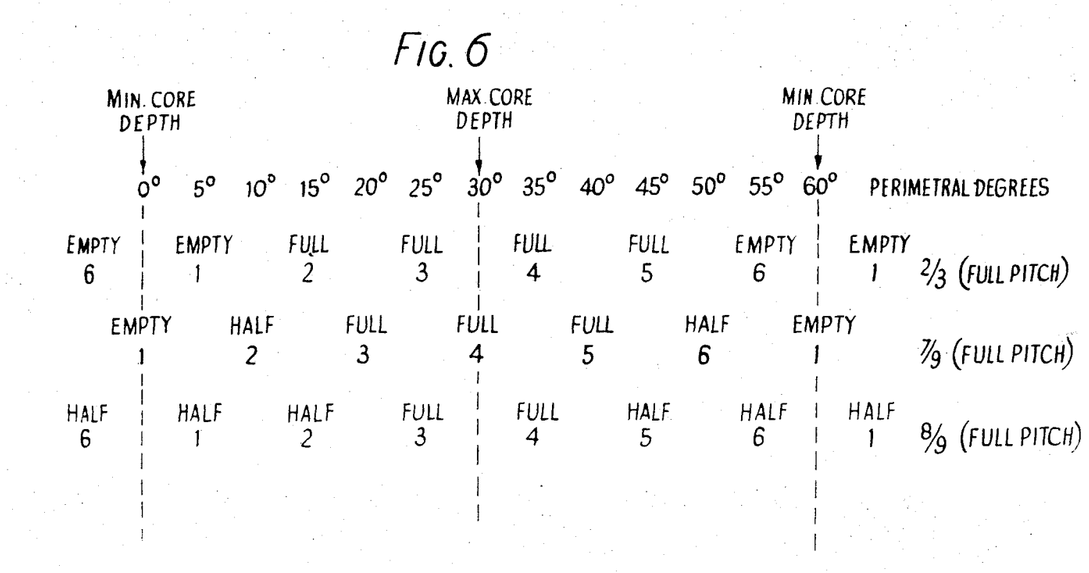
FIG. 6 is a diagram showing the disposition of slots throughout 60° for the winding of FIG. 4.

In FIG. 6, the angular spacing for six slots is shown at the head of the diagram. Below are shown the disposition and contents of the slots for two-thirds full-pitch, seven-ninths full-pitch and eight-ninths full-pitch arrangements. In practice, eight-ninths (full-pitch) will normally be preferred on every ground, as FIG. 6 further makes clear.

Figure 7:
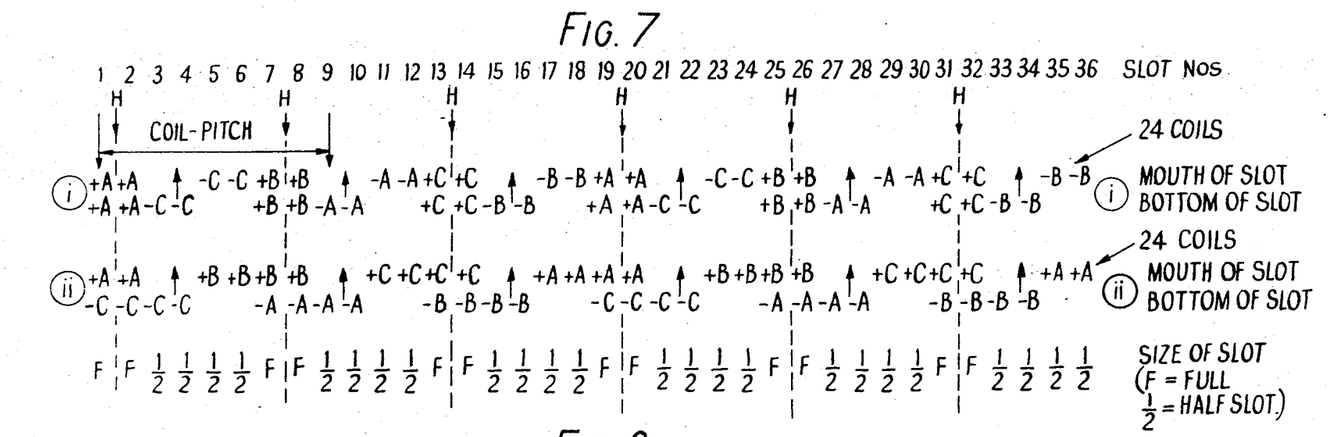
FIG. 7 is a diagram showing at (i) and (ii) two alternative windings for four-pole, three-phase, 36-slot, hexagonal-core induction motors.

Of the various possibilities analyzed by computer, two of the resultant windings were selected as being the best, and the winding distributions of these, relative to the slots, are shown in FIG. 7.

FIG. 7 shows the slot numbers at the head of the diagram and below shows two alternative windings, identified as (i) and (ii), for a four-pole, three-phase machine, and the slot depth is shown at the foot of the diagram. The letters "H" indicate the corners of the hexagonal core punching.

Each alternative winding includes 12 coil-sides, shown by the vertical arrows, which lie in the half-depth slots. The first alternative has a slightly higher winding factor, but also a slightly higher harmonic content, and it is made up of 12 groups of two coils: the second has a slightly lower winding factor, but also a slightly lower harmonic content, and it is made up of six groups of four coils, and thus it has fewer interconnections. Both windings would be fully acceptable, but the second would be slightly simpler to manufacture. Both require the same punching, as shown in FIG. 5.

While it is considered that hexagonal punchings will prove to be the most important case of polygonal punchings, the invention provides for other configurations; in particular, square punchings and triangular punchings.

It is possible, by careful design, to wind a wholly satisfactory polyphase armature with certain coils omitted from the usual 'uniform' layout; and the omission of these coils, and of the corresponding slots, permits the use of polygonal punchings, for the manufacture of standard motors. There is much scope for variation from such a basic arrangement.

It is, for example, possible to use some slightly irregular punching shape, or a regular shape which cannot be punched completely without waste of metal. For example, a regular nine-sided punching has certain technical merits, but it cannot be cut out of sheet metal without some waste. Alternatively, a rectangular punching can always be punched without waste, and in some cases this shape could be advantageous.

Coil-omission, and a "discontinuous" winding of some kind, is an essential feature of these arrangements. It is the combination of a "discontinuous" winding with a punching of unusual geometrical shape which constitutes the novelty of these arrangements.

Figure 8:
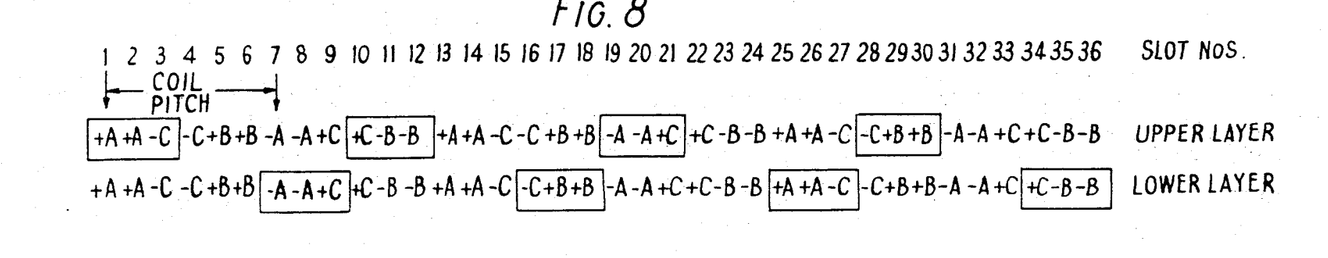
FIG. 8 is a diagram showing a six-pole, three-phase, 36-slot winding for for use in square stator punchings.

It is not possible to use a hexagonal punching for all pole numbers; and, for example, it is not possible to remove six equidistant 'blocks' of coils from a three-phase six-pole winding, because every sixth slot contains coils of the same phase. A discontinuous six-pole winding, adapted to a hexagon, is therefore not a possibility. On the other hand, a six-pole winding in 36 slots as shown in FIG. 8 can have four 'blocks' of three coils each, omitted from the winding, for use in a square punching. A 90° section of the punching is shown in FIG. 9.

In FIG. 8 the slot numbers are shown at the top of the diagram and the upper and lower layers are shown below. The coils within the rectangular boxes are omitted, that is one-third of all the coils are omitted. All the coils are full-pitch.

Figures 9, 10:
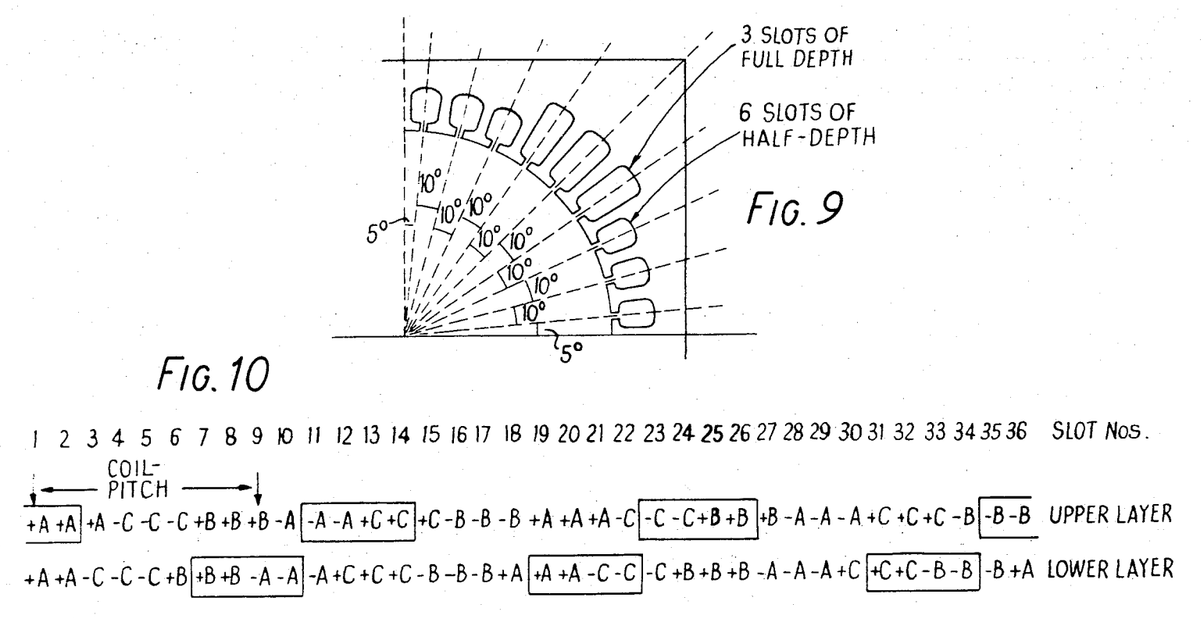
FIG. 9 shows a portion of a square stator punching showing in particular the slot arrangement throughout 90° to receive the winding of FIG. 8.
FIG. 10 is a diagram showing a four-pole, three-phase, 36-slot winding for use in triangular stator punchings.

From FIG. 9, it will be seen that the core punching is square with three full-depth slots in the region of each corner (12 full-depth slots in all) with six half-depth slots between (24 half-depth slots in all) all spaced apart by 10°. The coil-pitch is six-slots, slot one to slot seven and so on.

From a manufacturing point of view a square punching has much to recommend it and it can be manufactured with absolutely no waste of material. In principle, a square punching has four points of flux-concentration, and thus requires the omission of four 'blocks' of coils; and FIG. 8 shows the winding layout of a three-phase six-pole winding in 36 slots, suitable for use in a square punching. Four sets of three coils are omitted, the total omission being one-third of the winding, as before. Similarly, as seen from FIG. 8, with the use of full-pitch coils there are altogether 12 full-slots and 24 half-full slots. It is almost certain that full-pitch coils would be chosen in this case. The slotting for one-fourth of the stator punching is shown in FIG. 9. This figure should be compared with FIG. 5, which shows the slotting for a hexagon.

Simple construction of the slot vector star for this discontinuous winding will show that the layer (spread) factor, for the 24 coils which it includes, is 0.966, which is very satisfactorily high.

Theoretically, windings which can be accepted by hexagonal punchings can also be accepted by equilateral triangular punchings. Triangular punchings are not likely, however, to commend themselves on constructional grounds, because a frame to contain them would probably be inconvenient and wasteful of material. Nonetheless, it should be noted that a four-pole three-phase 36 slot winding can be constructed in a triangular punching, which requires the omission of three 'blocks', of four coils each, at the three points of flux-concentration.

In FIG. 10 is shown a layout of such a winding; and it will be seen that the use of coils of eight-ninths (full-pitch) will again give 12 full-slots (three sets of four) and 24 half-full slots (three sets of eight). This winding fits perfectly into a triangular punching; and, although it is not likely to find much practical use, is an example of the generality of the use of the invention.

It should further be noted that the omission boxes, which enclose four coils, in the winding of FIG. 10, can be extended or reduced (all to the same degree) without affecting the balance of the winding. Any proportion of the winding, at will, can be omitted.

Small motors seldom have more than six poles, and it is unusual for them to have more than 36 slots; but it will illustrate the generality of the invention to consider eight-pole windings, both in 36 slots and in 48 slots.

Figure 11:
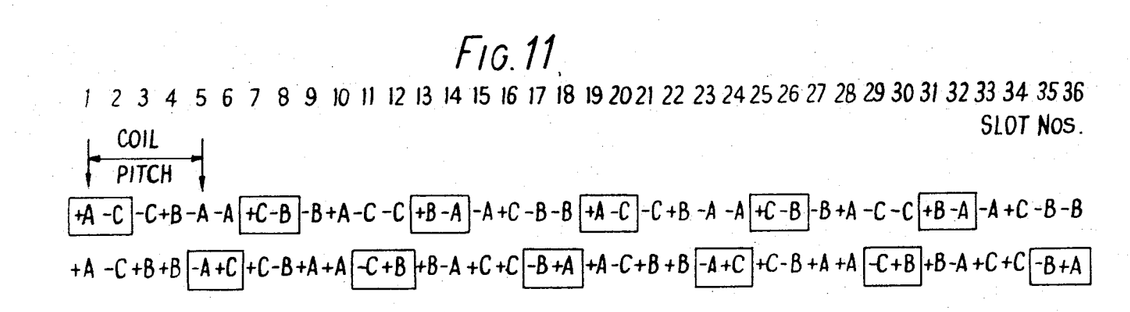
FIG. 11 is a diagram showing an eight-pole, three-phase, 36-slot, fractional-slot winding for use in hexagonal stator punchings.

An eight-pole winding in 36 slots is necessarily a fractional-slot winding, and will normally be grouped 1-2-1-2-1-2-1-2 per phase. The layout of such a winding is shown in FIG. 11. The six 'blocks' show the six pairs of coils which can be omitted, to form a winding suitable for a hexagonal punching; and, if the coils are of four slots pitch, = 8/9 (full-pitch), there will be two full-depth slots, and four half-depth slots, in each 60° section of the winding. The same punching as shown in FIG. 5, and there used for a four-pole winding, can thus also be used for this eight-pole winding. It is possible to excise the six 'blocks' of two coils in two different fashions, depending on whether each 'block' includes one coil from each of two phases, or two coils from one phase. The latter winding can be obtained by shifting all the 'blocks' in FIG. 11 one slot to the right. The choice between these two alternatives will be made after considering the m.m.f. analyses of the two windings.

It is of interest to note that the coil-omission principle can be applied to some fractional-slot windings, as here, as well as to integral-slot windings. The windings previously considered in this specification have been integral-slot windings.

Figure 12:
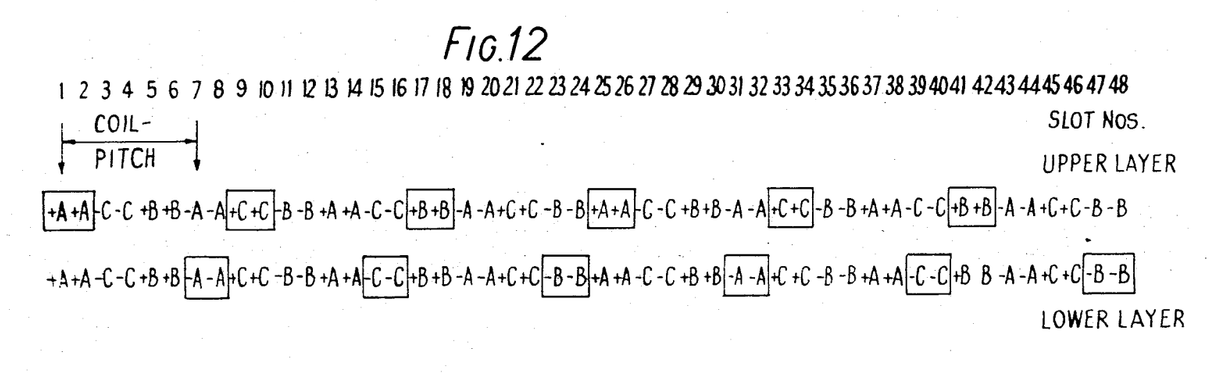
FIG. 12 is a diagram showing an eight-pole, three-phase, 48-slot winding for use in hexagonal stator punchings.

It is not possible exactly to specify the proportion of the winding to be removed independently of the number of slots. Plainly, the number of coils to be removed from a winding suitable for a hexagonal punching must be a multiple of "6". It is therefore possible to remove one-sixth or one-third of the total number of coils in a winding for a hexagonal punching with 36 slots, but only one-eighth or one-fourth of the coils where there are 48 slots. A design for an eight-pole 48-slot winding with one-fourth of the coils removed is shown in FIG. 12.

The principles set out in this specification are fully applicable, mutatis mutandis, to motors of any pole-number; but the greatest industrial application is likely to be to smaller motors of four, six or eight poles. Examples are given for all these pole-numbers, simply as particular embodiments of the invention. There is an almost unlimited number of possible embodiments, within the scope of the general principles described, for every pole-number, and for any size of machine.

Having obtained a winding suitable for a hexagonal core, it may—in some cases—be possible further to improve it, by modification for either or both of the following reasons:
 a. to fit the coils more exactly into a hexagonal core; and
 b. to make the coils suitable for automatic machine winding.

The modifications required, in any particular case, must be mainly ad hoc, and it is not possible to lay down general rules. The line of approach will, however, be exemplified by the particular case discussed below.

All the windings hitherto discussed in this specification have been derived from conventional double-layer diamond windings, simply by omitting some coils. As a result, some of the slots have had left in them only one coil-side, which would normally have been placed at the bottom of the slot. It was then possible to halve the depth of these slots, by lifting the corresponding coil-sides to the tops of the slots. The end windings of the coils concerned have thereby been slightly distorted physically; but this is the only way in which the form of the coils has hitherto been changed, in the development of windings suitable for polygonal punchings.

It has now been found possible to rearrange the form of some of the windings; so that while producing exactly the same magnetic field, the form of the coils becomes concentric. This form of coil is likely to be simpler to manufacture, and to lend itself to machine winding. Examples of this arrangement are shown in FIGS. 13 and 14.

In FIG. 7, there were shown two satisfactory three-phase windings for a four-pole motor, with 36 slots, in a hexagonal core. The second of these windings consists of six groups, of four coils each, of which the layout is there given. This winding layout is repeated at (a), at the top of FIG. 13; and at (b) it is modified, for simplicity, into an 18-slot winding, with six groups of two coils each, the coil-grouping being the same as at (a). For three of the 18 slots, two coil-sides in the same slot are then interchanged, as shown at (c).

Figure 13:
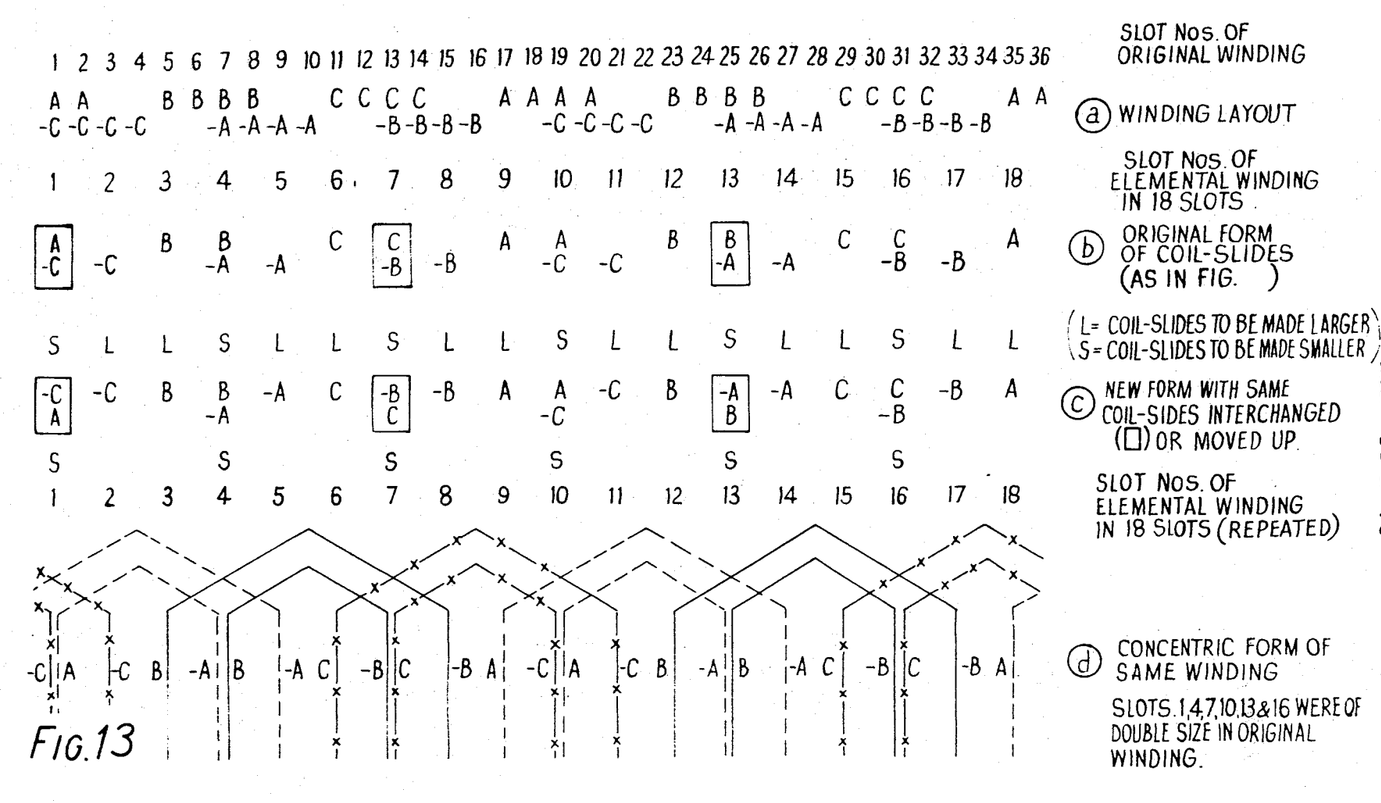
FIG. 13 is a diagram showing the conversion of a double-layer winding in 36 slots into concentric form.
Figure 14:
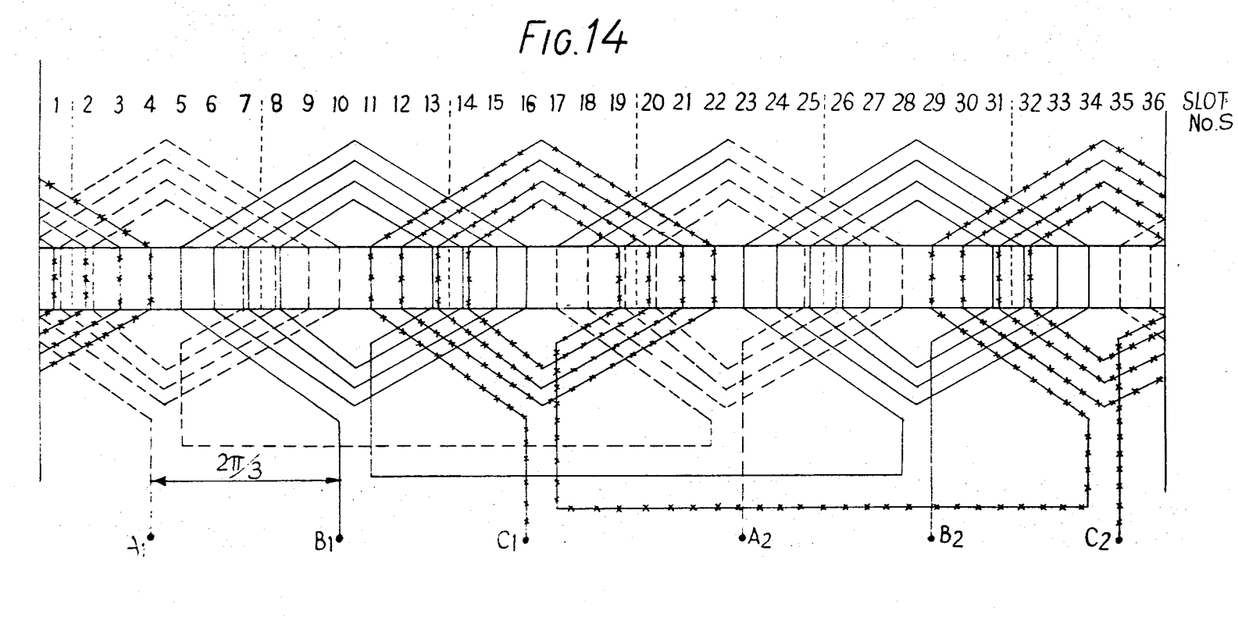
FIG. 14 is a slot winding diagram for a four-pole, three-phase, 36-slot concentric winding for a hexagonal stator induction motor.

By inspection of the resultant at (c), it will become clear that all the coil-sides can be connected together so as to form an 18-slot concentric winding, as shown in FIG. 13 at (d). Finally, the resultant can be restored to 36-slot form, by doubling all the coils of FIG. 13 (d), to reverse the process whereby all those at (a) in FIG. 13 were originally halved in number, on changing to (b).

It will be seen at once that the winding of FIG. 13 has the six outer coils of the six concentric pairs wholly accommodated in the 12 smaller slots which hold one coil-side each; whereas the six inner coils of the six concentric pairs are accommodated in the six larger slots which hold two coil-sides each.

It is therefore possible to make the larger slots smaller, and the smaller slots larger, by increasing the number of turns per coil in the six outer coils, and decreasing the number of turns per coil in the six inner coils. There is complete freedom of choice; but, for the same total winding space, the increase in the size of the smaller slots has to be only half the decrease in the size of the bigger slots.

Taking the slot-depths of the original "discontinuous" winding—shown in FIG. 7 and FIG. 13 at (a)—as proportional to 0.5 and 1.0, respectively, it is possible to change these to 0.625 and 0.75, or to 0.6 and 0.8 respectively, for example. There is thus complete freedom to fit the coil and slot-sizes to give the optimum arrangement.

Using the elemental winding in 18 slots (FIG. 13) as a basis, the complete winding diagram for a four-pole three-phase 36-slot winding in a hexagonal core can be drawn out, as shown in FIG. 14.

Each phase contains two groups each of four coils, each group wound concentrically. In this original form, all the coils have equal numbers of turns. The only difference between this winding and a standard 48-slot single-layer concentric winding with 24 coils is that 12 of the 48 coil-sides are contained, pair-by-pair, in single large slots. The actual number of slots is thus reduced to 36, instead of 48.

A standard four-pole three-phase 48-slot single-layer concentric winding can be machine-wound by an automatic winding machine. It seems almost certain that the same winding machine could wind this new type of winding in 36 slots. At the most, it might be necessary, as an extra, to press one phase to the bottom of its slots, before winding the second (or third) phase.

As explained above, it is possible to change the relative slot-depths of the 12 smaller slots and the 24 deeper slots by altering the relative numbers of turns in the four concentric coils. Any combination of slot-depths can be obtained.

The means of changing the numbers of turns per coil, in an automatic winding machine, are very simple, this being done by rotating a small knurled wheel. Clearly, it is possible to shift the knurled wheel, on a regular cycle, automatically, and thus to use it to wind this, the latest form of modified hexagonal core winding. Except that the numbers of turns in the two outer concentric coils are different from the numbers in the two inner concentric coils, the winding is basically a normal single-layer concentric winding.

The change in the relative numbers of turns will have a second-order effect on the m.m.f. waveform; and before proceeding with manufacture it is necessary to analyze this. There is little fear, however, of trouble arising in a winding which is only nonstandard to this limited extent. The ratio of slot-sizes, and of turns-numbers, is best decided on constructional grounds, having in mind the requirement to fit the end-windings neatly inside the end-brackets.

The explanation above has related solely to single-speed motors. There is, however, a possibility of combining the hexagonal (or square) punching technique with a two-speed or three-speed winding, according to the principles of pole-amplitude modulation (P.A.M.).

A feature of early P.A.M. windings was that some coils were removed from the circuit at one of the two speeds, using an arrangement shown for example in FIGS. 11a and 11b of U.S. Pat. No. 3,233,159. This arrangement has now become obsolescent, but it is possible that it might be desired again to use it in windings with unequal slottings. For example, a four/six-pole P.A.M. winding in 36 slots, using punchings as shown in FIG. 5 of the present specification might have a winding which was used as a whole for the four-pole switching, but which excluded half the winding of the deeper slots (only) when they are switched in to the six-pole connection.

There is a variety of such possibilities. In this specification it is merely necessary to mention that polygonal punchings and P.A.M. windings, for three-phase machines, can in some cases be advantageously combined. Those skilled in the art will be readily able to provide designs for particular cases.

The principles of this invention have hitherto been applied to diamond-type windings, which were initially of double-layer construction and which retained two coil-sides in some—at least—of the slots in the final winding. It is equally possible to apply the same concepts to single-layer concentric windings; and a suitable choice of coil grouping can lead to a very simple and satisfactory winding. The original coil grouping of the basic winding in 36 slots shown in FIG. 15 was 1-2-2-1-1-2-2-1 per phase; and by coil omission it will yield and eight-pole, 24-slot, three-phase winding for use in a hexagonal punching, the 24 slots being in six groups of four slots, spaced by 10°, at the six corners of the hexagon. The punching would be similar to that in FIG. 5 except that the two slots opposite the centers of the sides of the hexagon would be omitted.

An even better conformity with the hexagonal punching can be obtained if the six outer coils of the six groups are wound with more turns, and in larger slots, than the six inner coils.

Yet again, it would be possible to insert a third concentric coil, for the same phase, in the center of each existing pair of coils, and to use the graded punching already shown in FIG. 5, though this would give 120° spread and a low winding factor.

Figure 15:
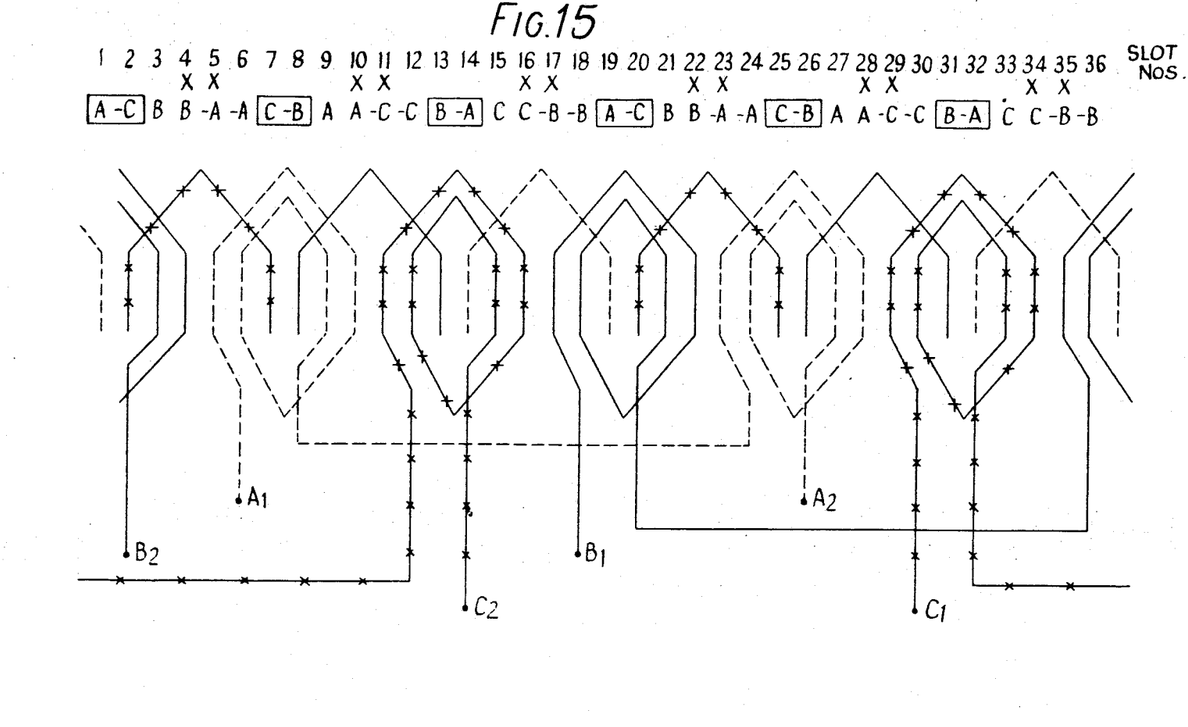
FIG. 15 is a slot winding diagram of an eight-pole, three-phase, single-layer concentric winding for hexagonal stator punchings.

Finally, it would be possible to fill up the empty slots in the arrangement of FIG. 15 with single concentric coils, so as to form a normal eight-pole, three-phase, single-layer winding, but with two coils out of three of half the size of the rest. Such a winding would then fit precisely into the punching of FIG. 5. The additional six coils for this last proposal are superimposed on the winding diagram to show their general arrangement, though they are not connected in circuit.

We claim:

1. A three-phase electric motor having a P-pole stator winding wound on a slotted stator core of polygonal punchings providing N flat sides, where N and P are different numbers from each other, said stator winding comprising a three-phase, P-pole, double-layer winding wherein coils are omitted from both top and bottom layers, said omitted coils extending over at least one phase band, being uniformly spaced apart around the winding circumference in both the top and bottom layers and the omitted coils being from consecutive slots in the top and bottom layers, the slots of said stator core being radial and evenly spaced apart around the winding circumference, those slots adjacent flat sides of the core being of one-half depth of the remainder and being occupied by residual coils from said consecutive slots of said winding from which coils have been omitted.

2. A three-phase electric motor having a P-pole stator winding wound on a slotted stator core of polygonal punchings providing N flat sides, where N and P are different numbers from each other, said stator winding comprising a three-phase, P-pole, double-layer winding wherein coils are omitted from both top and bottom layers, said omitted coils extending over at least one phase band, being uniformly spaced apart around the winding circumference in both the top and bottom layers and the omitted coils being from overlapping groups of slots for the top and bottom layers, the slots of said stator core being radial, omitted from those positions corresponding to omitted coils of said winding in both the top and bottom layer and being of one-half depth in those positions corresponding to omitted coils in one only of the top and bottom layers, the slots of half-depth being adjacent flat sides of the core, the remaining slots being of full depth.

3. A three-phase electric motor having a P-pole stator winding wound on a slotted stator core of polygonal punchings providing N flat sides, where N and P are different numbers from each other, said stator winding comprising a three-phase, P-pole, double-layer winding wherein coils are omitted from both top and bottom layers, said omitted coils extending over at least one phase band, being uniformly spaced apart around the winding circumference in both top and bottom layers and the omitted coils being from corresponding groups of slots in both top and bottom layers of said prototype winding, the slots of said stator core being radial, omitted from those positions corresponding to omitted coils in both top and bottom layers of said winding, the omitted slots being adjacent the flat sides of said stator core, the remaining slots being of uniform depth.

* * * * *